(No Model.) 2 Sheets—Sheet 1.

M. G. HUBBARD.
CAR TRUCK.

No. 423,158. Patented Mar. 11, 1890.

Attest:
Geo. T. Smallwood
Jas. K. McLachran

Inventor
Moses G. Hubbard
By A. H. Smith & Son,
Attorneys.

(No Model.) 2 Sheets—Sheet 2.

M. G. HUBBARD.
CAR TRUCK.

No. 423,158. Patented Mar. 11, 1890.

Attest: Geo. T. Smallwood, Jas. K. McCathran

Inventor: Moses G. Hubbard. By A. H. Smith & Son, Attorneys

UNITED STATES PATENT OFFICE.

MOSES G. HUBBARD, OF PHILADELPHIA, PENNSYLVANIA.

CAR-TRUCK.

SPECIFICATION forming part of Letters Patent No. 423,158, dated March 11, 1890.

Application filed May 11, 1889. Serial No. 310,441. (No model.)

*To all whom it may concern:*

Be it known that I, MOSES G. HUBBARD, of Philadelphia, county of Philadelphia, and State of Pennsylvania, have invented a new and useful Improvement in Car-Trucks, of which the following is a full, clear, and exact description, reference being had to the accompanying drawings, making part of this specification.

My invention consists in certain improvements which contribute to form a simple, light, and cheap railroad-car truck for elevated roads and for electric and cable cars, and some of the elements of which are applicable to my improved car-truck patented September 25, 1888, No. 389,965.

My invention relates, first, to the construction and arrangement of the truck-bolster and its attachment to the truck.

It further relates to the construction of the wheel-pieces, outside sills of the truck and their attachment, and to the construction and arrangement of the springs upon which the truck is mounted.

It further relates to the attachment and manner of operating the brakes, and to certain other features hereinafter more fully described, reference being had to the accompanying drawings, in which—

Figure 1:
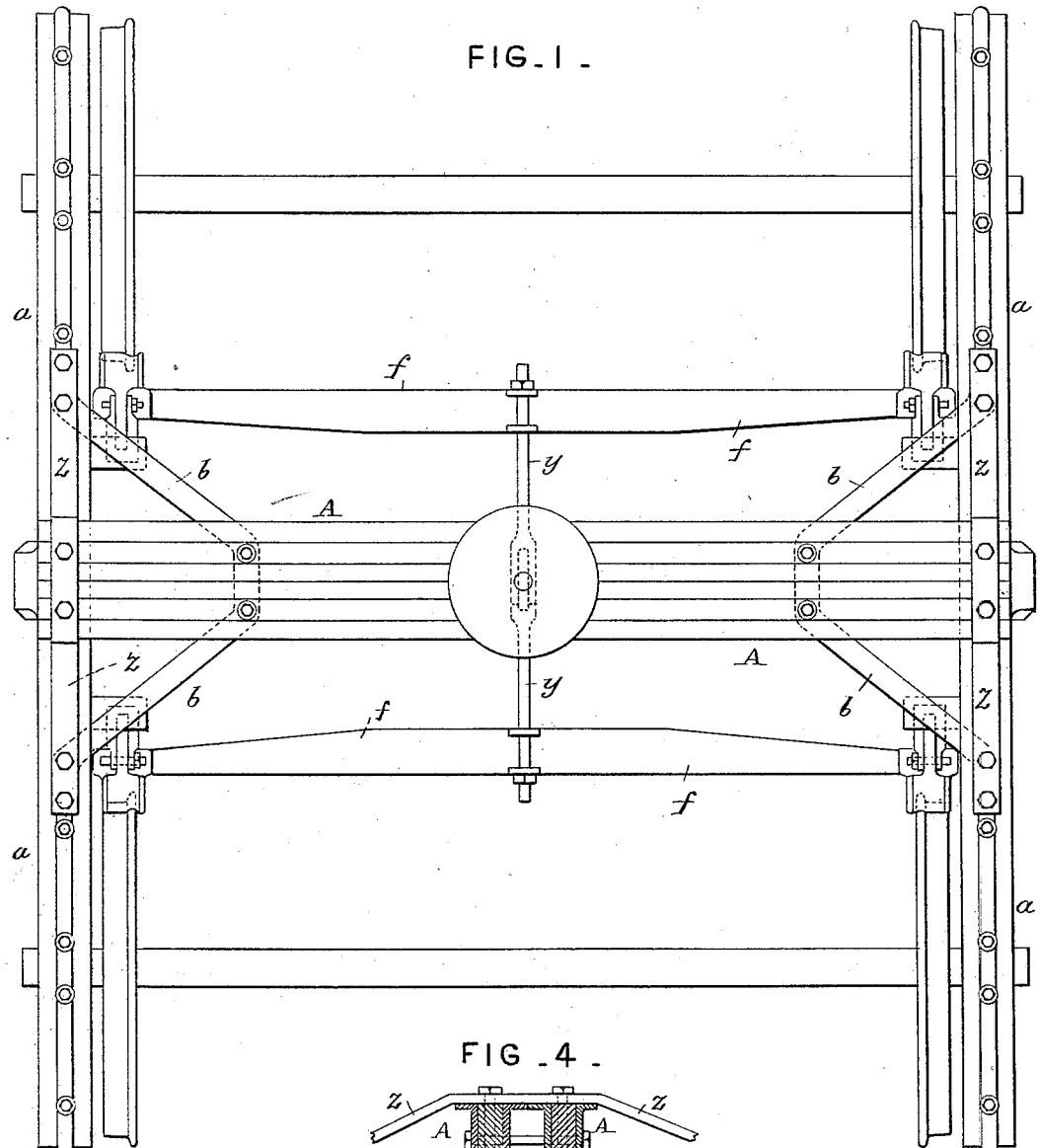
Figure 4:
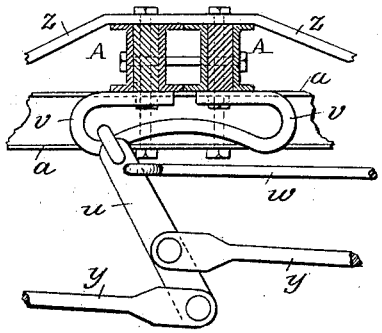
Figure 2:
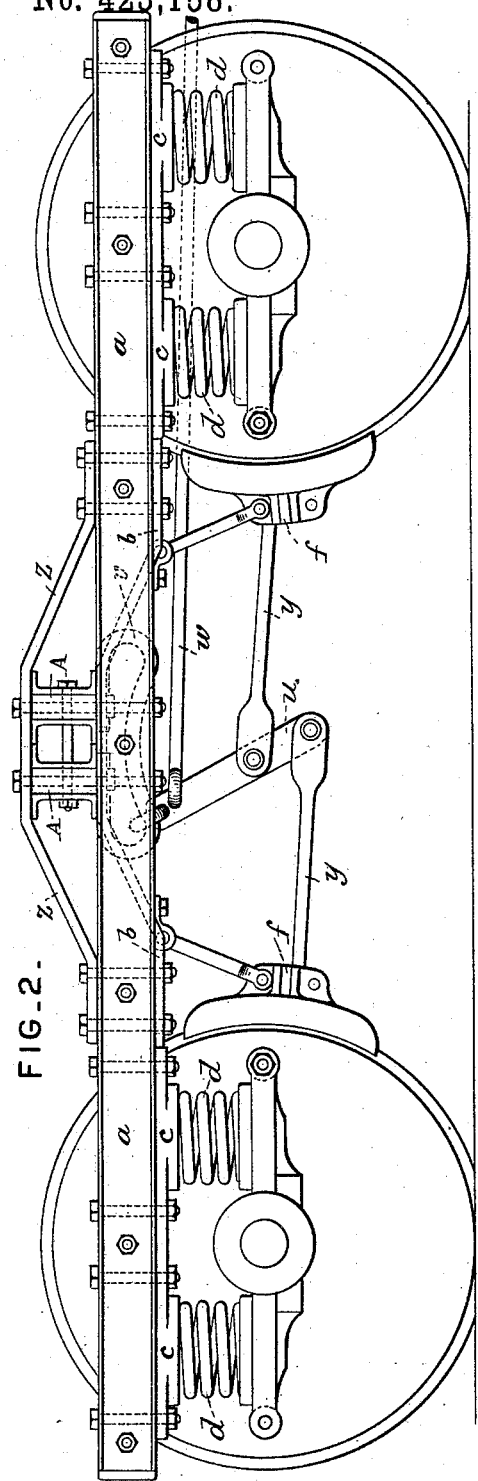
Figure 3:
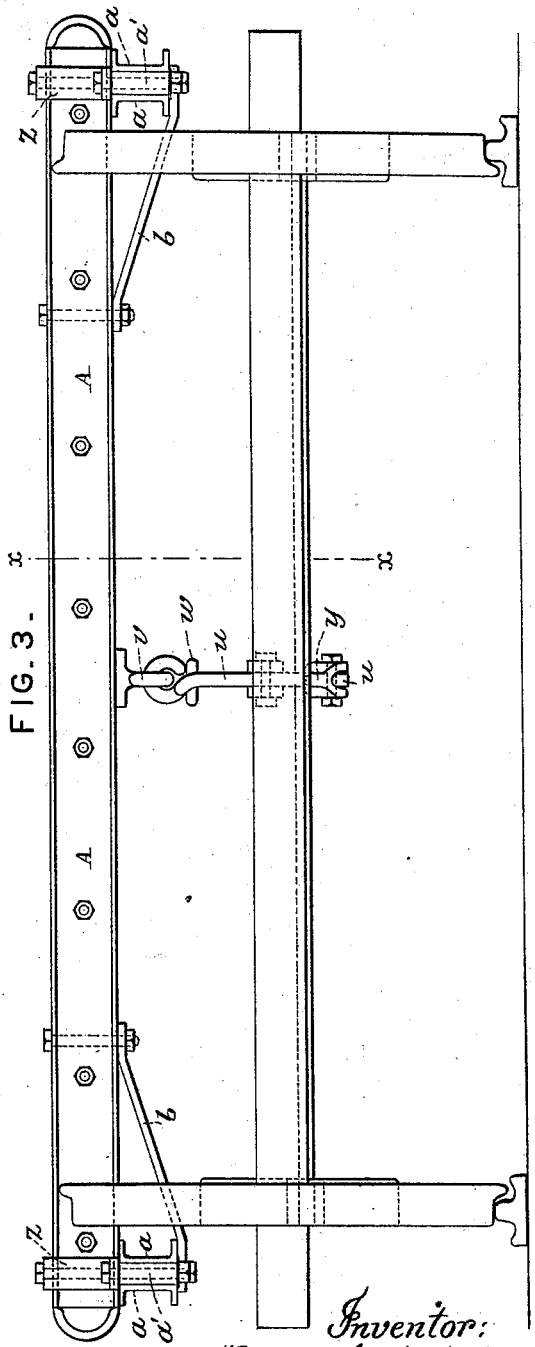

Figure 1 is a top or plan view of my improved truck. Fig. 2 is a side view, and Fig. 3 is an end view, thereof. Fig. 4 is a longitudinal section on the line $x\ x$ of Fig. 3.

As the truck-bolster has nearly as much weight to support as both of the wheel-pieces, it ought to be about double the strength of a wheel-piece, and, as uniformity in size and kind of material is both convenient and economical, I construct the bolster in the double form shown at A A in Figs. 1 and 2, and of the same kind of material used in the wheel-pieces B and B, and together they compose the frame-work of my truck, and as they are subjected to great strain in every direction it is important to combine in them and their attachments the greatest possible strength and durability. I have found that the double-plated wheel-pieces constructed as more fully described in my patent dated September 7, 1886, No. 348,741, possess these qualities in a great degree; but under some circumstances— such, for instance, as when the springs are located under the wheel-pieces and the bolster on top of them, as in my truck herein described—the height of the truck is so much increased that it is necessary to economize the vertical space which they occupy, and I must therefore attain the required strength in less vertical space than my said previous plan of double-plating would occupy. For these reasons, and sometimes for improved appearance, I construct the plates with ribs projecting horizontally from their upper and lower edges in the form of channel-iron, as shown at $a\ a$, Fig. 3, and firmly bolt or rivet them to the wooden center $a'$, which forms a convenient arrangement for vertical bolts, and the crystallization of the iron by vibration, which so often destroys these parts of a truck when made wholly of iron, is entirely avoided. This construction adds so greatly to the vertical strength of the bolster and wheel-pieces that they may be made much narrower than my said previous plan would permit, and by firmly bolting the bolster to the top of the wheel-pieces and extending braces from it down under the wheel-pieces, to which they are firmly bolted, as shown at $b\ b$ in Figs. 1 and 3, the wheel-pieces are strongly supported on their upper and under sides without mortising or otherwise mutilating the inner plates, substantially in the same manner as described in my last-named patent. I construct the two parts of the bolster on the same plan and thus attain great vertical strength of the whole truck-frame within the least possible vertical space with ample diagonal strength and stiffness. The arch-irons Z Z serve the double purpose of outer bolster-bearings and greatly strengthen the wheel-pieces and their connections to the bolster, and they should be covered with a steel wearing-plate for greater durability. The spring-caps C C, Fig. 2, are bolted to the under side of the wheel-pieces, and by their deep annular flanges surrounding the springs $d\ d\ d\ d$ hold the truck securely upon them as they rest upon the spring-seats projecting from the journal-boxes, and are held therein by similar deep annular flanges which surround the springs. These springs are made of large steel and of large diameter to give unusual vibrating capacity and large base to support the truck horizontally without auxiliary braces or pedestals. They should be constructed in the manner described in my said patents in order to give the necessary elasticity and horizontal stiffness to sustain the car or truck securely and yet flexibly in a horizontal direction, as it is desirable in these light trucks to provide for as much longitudinal as lateral freedom, because they are worked on rough tracks, and it is one of the peculiar advantages of my construction of these vertical springs that they are capable of sustaining the car horizontally in every direction, and are therefore capable of attaining an unlimited freedom of the wheels, except as controlled by the unusual strength and stability of the springs due to my improved construction.

I find it very desirable in these trucks to operate the brakes from a point as near to the center of the truck as possible to avoid varying the length of the brake-rods by the turning of the truck. For this purpose I attach the brake-connections $y$ $y$ to the brake-beams $f$ $f$ and to the vertical lever $u$, which is suspended at or near the center of the truck by the hanger or bracket $v$, Figs. 2 and 3, which is attached to the under side of the truck-bolster. The lower or horizontal portion of this hanger is formed on a circle the center of which is located about midway between the two points of attachment of the brake-connections $y$ $y$ with the lever $u$, so that the end of said lever, while sliding on the horizontal or curving portion of the hanger $v$ in operating the brakes, will not change the vertical position of the lever and brake-connections pivoted to it. Near the upper end of this lever is pivoted the brake-rod $w$, by which the brakes are operated in the usual manner.

Having now described my invention, I claim as new—

1. The double-plated wheel-pieces constructed with wooden centers and channel metal plates bolted or united thereto, substantially as and for the purposes described.

2. The double-plated wheel-pieces constructed with a wooden center and channel metal plates bolted or united thereto, in combination with the cross sills and braces secured one to the top and the other to the under sides of the wheel-pieces, whereby the inner plates remain whole and free from mortises and the entire strength of both of the channel metal plates is preserved and utilized, substantially as set forth.

3. The double-plated truck-bolster constructed with wooden center and flanged metal plates bolted or otherwise attached firmly thereto, substantially as and for the purposes specified.

4. The combination of the double-plated wheel-pieces with the double-plated bolster and diagonal braces arranged substantially as and for the purposes described.

5. The arch-iron Z Z, in combination with the double bolster and wheel-pieces for strengthening the wheel-pieces and connecting the bolster more securely thereto, substantially as described.

6. The combination of a double-plated bolster bolted to the top of each wheel-piece at or near its center, the diagonal braces extending from the bolster to the under side of the wheel-pieces and bolted thereto, and the double-plated wheel-pieces mounted upon the springs, substantially as and for the purposes described.

7. The combination of the centrally-located bolster resting upon the wheel-pieces with the arch-irons and the wheel-pieces, substantially as and for the purposes specified.

8. The combination of the vertical brake-lever located at the center of the truck and the bracket or hanger from which said lever is suspended, located immediately over it, substantially as and for the purposes described.

9. The hanger or bracket for suspending the brake-lever, having its lower end formed on the curve and thereby adapted to hold the brake-lever at a uniform height, substantially as and for the purposes set forth.

10. The combination of a brake-lever suspended under the bolster with a bolster located on the top of the wheel-pieces, whereby ample space is attained for the location and working of the vertical lever under the bolster, substantially as specified.

In testimony whereof I have hereunto set my hand this 29th day of January, A. D. 1889.

MOSES G. HUBBARD.

Witnesses:
WALTER B. McBRIDE,
RICHARD LONG.